(12) United States Patent
Eijsbouts et al.

(10) Patent No.: US 6,652,738 B2
(45) Date of Patent: Nov. 25, 2003

(54) PROCESS FOR PREPARING A MIXED METAL CATALYST COMPOSITION

(75) Inventors: Sonja Eijsbouts, Nieuwkuijk (NL); Bob Gerardus Oogjen, Almere (NL); Harmannus Willem Homan Free, Hoevelaken (NL); Marinus Bruce Cerfontain, Amsterdam (NL); Kenneth Lloyd Riley, Baton Rouge, LA (US); Stuart Leon Soled, Pittstown, NJ (US); Sabato Miseo, Pittstown, NJ (US)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 10/346,018

(22) Filed: Jan. 16, 2003

(65) Prior Publication Data

US 2003/0102254 A1 Jun. 5, 2003

Related U.S. Application Data

(60) Division of application No. 09/836,101, filed on Apr. 17, 2001, now Pat. No. 6,534,437, which is a continuation-in-part of application No. 09/482,812, filed on Jan. 13, 2000, now abandoned, which is a continuation-in-part of application No. 09/231,125, filed on Jan. 15, 1999, now abandoned, and a continuation-in-part of application No. 09/231,118, filed on Jan. 15, 1999, now abandoned.

(51) Int. Cl.$^7$ ............ C10G 45/04; C10G 45/46; C10G 45/60; C10G 47/02

(52) U.S. Cl. ............ 208/216 R; 208/217; 208/251 H; 208/264 H; 208/143; 208/111.3; 208/111.35; 585/275; 585/480; 585/671; 585/734

(58) Field of Search ............ 208/216 R, 217, 208/251 H, 264 H, 143, 111.3, 111.35; 585/275, 480, 671, 734

(56) References Cited

U.S. PATENT DOCUMENTS

| 2,873,257 A | 2/1959 | Hunter et al. ............ 252/465 |
| 3,678,124 A | 7/1972 | Stepanvo et al. ............ 260/680 |
| 4,113,605 A | 9/1978 | Mickelson ............ 208/216 |
| 4,153,578 A | 5/1979 | De Thomas et al. ............ 252/438 |
| 4,596,785 A | 6/1986 | Toulhoat et al. ............ 502/220 |
| 4,820,677 A | 4/1989 | Jacobson et al. ............ 502/220 |
| 6,156,695 A | 12/2000 | Soled et al. ............ 502/305 |
| 6,162,350 A | 12/2000 | Soled et al. ............ 208/113 |

FOREIGN PATENT DOCUMENTS

| CZ | 158758 | 7/1975 | ............ C07C/47/04 |
| DE | 30 29 266 | 2/1981 | ............ B01J/23/85 |
| EP | 0 014 218 | 8/1980 | ............ B01J/37/00 |
| EP | 133031 A1 * | 2/1985 | ............ C10G/45/08 |
| EP | 0 469 675 | 2/1992 | ............ B01J/27/188 |
| FR | 1 282 950 | 7/1972 | ............ C01G/39/00 |
| GB | 836 936 | 6/1960 | |
| JP | 97000929 A | 1/1997 | ............ B01J/23/88 |
| WO | WO 99/03578 | 1/1999 | ............ B01J/23/883 |
| WO | WO 99/42404 | 8/1999 | ............ C01G/51/00 |

OTHER PUBLICATIONS

Derwent Abstract: 97–113428/11.
Chemical Abstract: 84:80382y.
Derwent Abstract: 003155319.
Derwent Abstract No. 012712448 abstracting WO 99/42404.

* cited by examiner

*Primary Examiner*—Walter D. Griffin
(74) *Attorney, Agent, or Firm*—Louis A. Morris

(57) ABSTRACT

The invention pertains to a process for the hydroprocessing of a hydrocarbon feedstock wherein said feedstock is contacted at hydroprocessing conditions with a catalyst composition which comprises bulk catalyst particles which comprise at least one Group VIII non-noble metal and at least two Group VIB metals. The Group VIII and Group VIB metals comprise from about 50 wt. % to about 100 wt. %, calculated as oxides, of the total weight of the bulk catalyst particles. The metals are present in the catalyst composition in their oxidic and/or sulfidic state. The catalyst composition has an X-ray diffraction pattern in which the characteristic full width at half maximum does not exceed 2.5° when the Group VIB metals are molybdenum, tungsten, and, optionally, chromium, or does not exceed 4.0° when the Group VIB metals are molybdenum and chromium or tungsten and chromium.

5 Claims, 1 Drawing Sheet

PROCESS FOR PREPARING A MIXED METAL CATALYST COMPOSITION

RELATED U.S. APPLICATION DATA

Division of Ser. No. 09/836,101, filed Apr. 17, 2001, now U.S. Pat. No. 6,534,437, which is a Continuation-in-Part of Ser. No. 09/482,812, filed Jan. 13, 2000, now abandoned, which is a Continuation-in-part of Ser. No. 09/231,125, filed Jan. 15, 1999 now abandoned, and Ser. No. 09/231,118, filed Jan. 15, 1999 now abandoned.

FIELD OF THE INVENTION

The invention relates to a process for preparing a mixed metal catalyst composition comprising bulk catalyst particles comprising at least one Group VIII non-noble metal and at least two Group VIB metals.

BACKGROUND OF THE INVENTION

In the hydroprocessing of hydrocarbon feedstocks, the feedstocks are hydrotreated and/or hydrocracked in the presence of hydrogen. Hydroprocessing encompasses all processes in which a hydrocarbon feed is reacted with hydrogen at elevated temperature and elevated pressure including processes such as hydrogenation, hydrodesulfurization, hydrodenitrogenation, hydrodemetallization, hydrodearomatization, hydroisomerization, hydrodewaxing, hydrocracking, and hydrocracking under mild pressure conditions, which is commonly referred to as mild hydrocracking.

In general, hydroprocessing catalysts are composed of a carrier with a Group VIB metal component and a Group VIII non-noble metal component deposited thereon. Generally, such catalysts are prepared by impregnating a carrier with aqueous solutions of compounds of the metals in question, followed by one or more drying and calcination steps. Such a catalyst preparation process is described, e.g., in U.S. Pat. No. 2,873,257 and EP 0469675.

An alternative technique for the preparation of the above catalysts is described in U.S. Pat. No. 4,113,605, where, e.g., nickel carbonate is reacted with, e.g., $MoO_3$ to form crystalline nickel molybdate, which is subsequently mixed and extruded with alumina.

A similar process is disclosed in DE 3029266, where nickel carbonate is mixed with $WO_3$ and the resulting composition is mixed with alumina impregnated with, e.g., nickel nitrate and ammonium tungstate.

As the carrier itself has no or little catalytic activity, the activity of the above carrier-containing catalysts in hydroprocessing is rather moderate. It is therefore an object of the present invention to provide a catalyst which can be applied without a carrier. Such carrier-free catalysts are generally referred to as bulk catalysts.

The preparation of bulk catalysts is known, e.g., from GB 836,936 and EP 0014218. The catalyst of, e.g., EP 0014218 is prepared by spray-drying an aqueous slurry of potassium carbonate, potassium dichromate, vanadium oxide, iron oxide, portland cement, methyl cellulose, and graphite.

It is noted that all the above catalysts comprise one Group VIII non-noble metal and one Group VIB metal. Such catalysts have only moderate activity in hydroprocessing. It is therefore an object of the present invention to provide catalysts with increased catalytic activity.

GB 1 282 950 (D1) describes a process for manufacturing transparent gels containing iron and molybdenum and the uses thereof. The gels are prepared by a process in which the starting materials are mixed in the presence of a quantity of water not greater than that required to form individual saturated solutions of the compounds. Depending on the ratio between the reactants, the reaction mixture transfers to either a clear solution with a low viscosity or a more viscous solution containing a few undissolved crystals. What happens in the process of this reference is that the reactants in effect dissolve in their own crystal water, and thus react in the solute state. The compounds selected have a high solubility.

A more recent development is the application of catalysts comprising one Group VIII non-noble metal and two Group VIB metals.

Such a catalyst is disclosed, e.g., in JP 09000929, U.S. Pat. Nos. 4,596,785, U.S. 4,820,677, U.S. 3,678,124, U.S. 4,153,578, and non-prepublished international patent application WO 9903578.

The catalyst of JP 09000929, which is a carrier-containing catalyst, is prepared by impregnating an inorganic support with cobalt or nickel as Group VIII non-noble metal and molybdenum and tungsten as Group VIB metals.

CZ 158758 discloses the preparation of two separate precipitates by combining solutions of the various compounds. The first precipitate is prepared by combining solutions of ammonium molybdate and iron (3+) chloride. The second precipitate is prepared by combining solutions of ammonium molybdate and chromium (3+) chloride. The precipitates are washed in excess of distilled water, which is then removed by decantation. The suspensions of the two precipitates are combined, the mixture is filtered, the filter cake is washed with distilled water and dried static in air at room temperature, shaped by extrusion, dried at room temperature, then at elevated temperature and then calcined. The claim explicitly states that $Fe_2(MoO_4)_3$ and $Cr_2(MoO_4)_3$ are prepared from solutions of ammonium molybdate and solutions of soluble Fe(3+) and Cr(3+) salts.

The catalyst of U.S. Pat. No. 4,596,785 comprises the disulfides of at least one Group VIII non-noble metal and at least one Group VIB metal. The catalyst of U.S. Pat. No. 4,820,677 is an amorphous sulphide comprising iron as Group VIII non-noble metal and a metal selected from molybdenum, tungsten or mixtures thereof as Group VIB metal, as well as a polydentate ligand such as ethylene diamine. In both references the catalyst is prepared via co-precipitation of water-soluble sources of one Group VIII non-noble metal and two Group VIB metals in the presence of sulfides. The precipitate is isolated, dried, and calcined. All process steps have to be performed in an inert atmosphere, which means that sophisticated techniques are required to carry out this process. Further, due to this co-precipitation technique there are huge amounts of waste water.

It is therefore a further object of the present invention to provide a process which is technically simple and robust and which does not require any handling under an inert atmosphere during the preparation of the catalyst and in which huge amounts of waste water can be avoided.

U.S. Pat. No. 3,678,124 discloses oxidic bulk catalysts to be used in oxidative dehydrogenation of paraffin hydrocarbons. The catalysts are prepared by co-precipitating water-soluble components of the corresponding metals. Again, the co-precipitation technique results in huge amounts of waste water.

The catalyst of U.S. Pat. No. 4,153,578 is a Raney nickel catalyst to be used for the hydrogenation of butyne diol. The catalyst is prepared by contacting Raney nickel optionally containing, e.g., tungsten with a molybdenum component in the presence of water. Molybdenum is adsorbed on the Raney nickel by stirring the resulting suspension at room temperature.

Finally, in non-prepublished international patent application WO 9903578, catalysts are prepared by co-precipitating certain amounts of a nickel, molybdenum, and tungsten source in the absence of sulfides.

SUMMARY OF THE INVENTION

The present invention is a process for the hydroprocessing of a hydrocarbon feedstock wherein said feedstock is contacted at hydroprocessing conditions with a catalyst composition which comprises bulk catalyst particles which comprise at least one Group VIII non-noble metal and at least two Group VIB metals. The Group VIII and Group VIB metals comprise from about 50 wt. % to about 100 wt. %, calculated as oxides, of the total weight of the bulk catalyst particles. The metals are present in the catalyst composition in their oxidic and/or sulfidic state. The catalyst composition has an X-ray diffraction pattern in which the characteristic full width at half maximum does not exceed 2.5° when the Group VIB metals are molybdenum, tungsten, and, optionally, chromium, or does not exceed 4.0° when the Group VIB metals are molybdenum and chromium or tungsten and chromium.

Other embodiments of the present invention encompass further details relating to the above process, all of which are hereinafter disclosed in the following discussion of each of those facets of the invention.

DETAILED DESCRIPTION OF THE INVENTION

Figure 1:
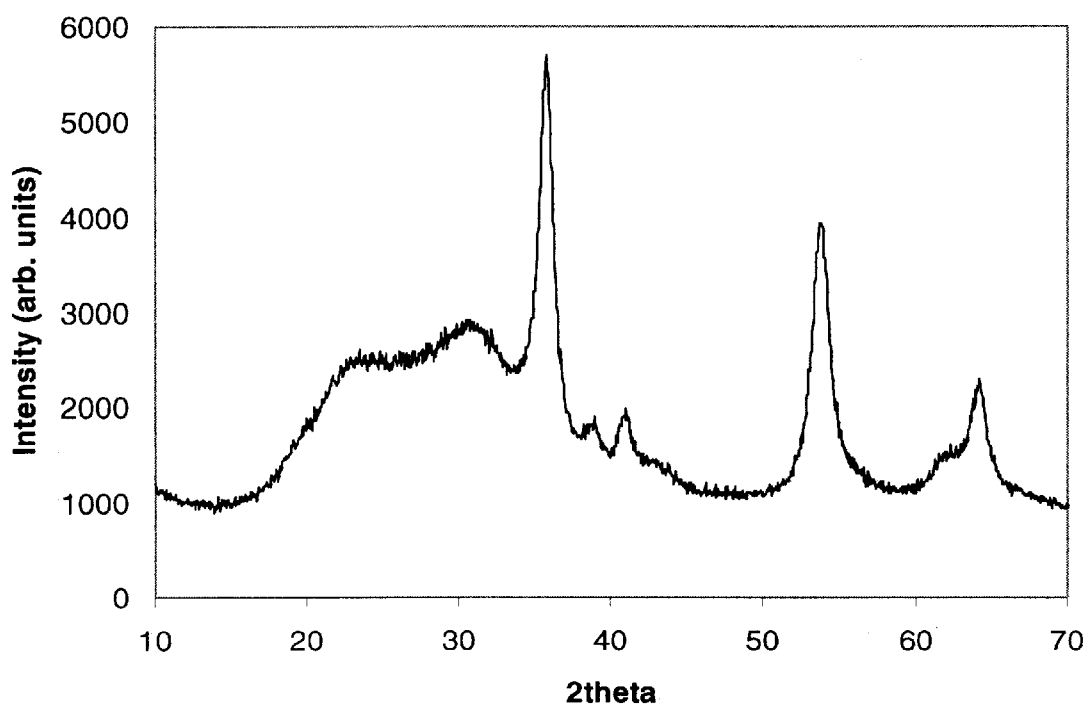
FIG. 1 is an X-ray diffraction pattern referred to in Example 1 as that of a catalyst composition prepared in accordance with the process of the present invention.

Process of the Invention
(A) Preparation of Bulk Catalyst Particles

The present invention is directed to a process for preparing a catalyst composition comprising bulk catalyst particles comprising at least one Group VIII non-noble metal and at least two Group VIB metals, which process comprises combining and reacting at least one Group VIII non-noble metal component with at least two Group VIB metal components in the presence of a protic liquid, with at least one of the metal components remaining at least partly in the solid state during the entire process.

It is thus essential to the process of the invention that at least one metal component remains at least partly in the solid state during the entire process of the invention. This process comprises combining and reacting the metal components. More in particular, it comprises adding the metal components to each other and simultaneously and/or thereafter reacting them. It is consequently essential to the process of the invention that at least one metal component is added at least partly in the solid state and that this metal component remains at least partly in the solid state during the entire reaction. The term "at least partly in the solid state" in this context means that at least part of the metal component is present as a solid metal component and, optionally, another part of the metal component is present as a solution of this metal component in the protic liquid. A typical example of this is a suspension of a metal component in a protic liquid in which the metal is at least partly present as a solid, and optionally partly dissolved in the protic liquid.

It is possible to first prepare a suspension of a metal component in the protic liquid and to add, simultaneously or one after the other, solution(s) and/or further suspension(s) comprising dissolved and/or suspended metal component(s) in the protic liquid. It is also possible to first combine solutions either simultaneously or one after the other and to subsequently add further suspension(s) and optionally solution(s) either simultaneously or one after the other.

In all these cases, a suspension comprising a metal component can be prepared by suspending a solid metal component in the protic liquid. However, it is also possible to prepare the suspension by (co)precipitating one or more metal components. The resulting suspension can be applied as such in the process of the invention, i.e. further metal components in solution, in slurry or per se are added to the resulting suspension. The resulting suspension can also be applied after solid-liquid separation and/or after optionally being dried and/or after optionally being thermally treated and/or after optionally being wetted or reslurried in the protic liquid. Instead of a suspension of a metal component, a metal component in the wetted or dry state can be used.

It must be noted that the above process alternatives are only some examples to illustrate the addition of the metal components to the reaction mixture. Generally, all orders of addition are possible. Preferably, all Group VIII non-noble metal components are combined simultaneously and all Group VIB metal components are combined simultaneously and the resulting two mixtures are subsequently combined.

As long as at least one metal component is at least partly in the solid state during the process of the invention, the number of metal components which are at least partly in the solid state is not critical. Thus it is possible for all metal components to be combined in the process of the invention to be applied at least partly in the solid state. Alternatively, a metal component which is at least partly in solid state can be combined with a metal component which is in the solute state. E.g., one of the metal components is added at least partly in the solid state and at least two and preferably two metal components are added in the solute state. In another embodiment, two metal components are added at least partly in the solid state and at least one and preferably one metal component is added in the solute state.

That a metal component is added "in the solute state" means that the whole amount of this metal component is added as a solution of this metal component in the protic liquid.

Without wishing to be bound by any theory, Applicant believes that the metal components which are added during the process of the invention interreact at least in part: the protic liquid is responsible for the transport of dissolved metal components. Due to this transport, the metal components come into contact with each other and can react. It is believed that this reaction can even take place if all metal components are virtually completely in the solid state. Due to the presence of the protic liquid, a small fraction of metal components may still dissolve and consequently react as described above. The presence of a protic liquid during the process of the present invention is therefore considered essential.

The reaction can be monitored by conventional techniques such as IR spectroscopy or Raman spectroscopy. The reaction is indicated in this case by signal changes. In some cases, it is also possible to monitor the reaction by monitoring the pH of the reaction mixture. The reaction in this case is indicated by pH change. Further, the completeness of the reaction can be monitored by X-ray diffraction. This will be described in more detail under the heading "Catalyst composition of the invention."

It will be clear that it is not suitable to first prepare a solution comprising all metal components necessary for the preparation of a certain catalyst composition and to subsequently coprecipitate these components. Nor is it suitable for the process of the invention to add metal components at least partly in the solid state and to choose the process conditions, such as temperature, pH or amount of protic liquid, in such a way that all added metal components are present completely in the solute state at least at some stage. On the contrary, as has been set out above, at least one of the metal components which is added at least partly in the solid state must remain at least partly in the solid state during the entire reaction step.

This may be contrasted with CZ 158758, which although involves a process where solid components comprising two Group VI metals and one Group VIII metal are combined, they do not react to form a new material. In the process of this reference, the resulting product is a mixture of two precipitates, while in the process according to the invention the product is a reaction product between the three components.

Preferably, at least 1 wt %, even more preferably at least 10 wt %, and still more preferably at least 15 wt % of a metal component is added in the solid state during the process of the invention, based on the total weight of all Group VIB and Group VIII non-noble metal components, calculated as metal oxides. When it is desired to obtain a high yield, i.e., a high amount of the final catalyst composition, the use of metal components of which a high amount remains in the solid state during the process of the invention may be the preferred method. In that case, low amounts of metal components remain dissolved in the mother liquid and the amount of metal components ending up in the waste water during the subsequent solid-liquid separation is decreased. Any loss of metal components can be avoided completely if the mother liquid resulting from solid-liquid separation is recycled in the process of the present invention. It is noted that it is a particular advantage of the process of the present invention that compared to a catalyst preparation based on a co-precipitation process, the amount of waste water can be considerably reduced.

Depending on the reactivity of the metal components, preferably at least 0.01 wt %, more preferably at least 0.05 wt %, and most preferably at least 0.1 wt % of all metal components initially employed in the process of the invention is added as a solution, based on the total weight of all metal components, calculated as metal oxides. In this way, proper contacting of the metal components is ensured. If the reactivity of a particular metal component to be added is low, it is recommended to add a high amount of this metal component as solution.

The protic liquid to be applied in the process of the present invention can be any protic liquid. Examples are water, carboxylic acids, and alcohols such as methanol, ethanol or mixtures thereof. Preferably, a liquid comprising water, such as mixtures of an alcohol and water and more preferably water, is used as protic liquid in the process of the present invention. Also different protic liquids can be applied simultaneously in the process of the invention. For instance, it is possible to add a suspension of a metal component in ethanol to an aqueous solution of another metal component. In some cases, a metal component can be used which dissolves in its own water of crystallization. The water of crystallization serves as protic liquid in this case. Of course, a protic liquid must be chosen which does not interfere with the reaction.

At least one Group VIII non-noble metal component and at least two Group VIB metal components are applied in the process of the invention. Suitable Group VIB metals include chromium, molybdenum, tungsten, or mixtures thereof, with a combination of molybdenum and tungsten being most preferred. Suitable Group VIII non-noble metals include iron, cobalt, nickel, or mixtures thereof, preferably cobalt and/or nickel. Preferably, a combination of metal components comprising nickel, molybdenum, and tungsten or nickel, cobalt, molybdenum, and tungsten, or cobalt, molybdenum, and tungsten is applied in the process of the invention.

It is preferred that nickel and cobalt make up at least 50 wt % of the total of Group VIII non-noble metal components, calculated as oxides, more preferably at least 70 wt %, still more preferably at least 90 wt %. It may be especially preferred for the Group VIII non-noble metal component to consist essentially of nickel and/or cobalt.

It is preferred that molybdenum and tungsten make up at least 50 wt % of the total of Group VIB metal components, calculated as trioxides, more preferably at least 70 wt %, still more preferably at least 90 wt %. It may be especially preferred for the Group VIB metal component to consist essentially of molybdenum and tungsten.

The molar ratio of Group VIB to Group VIII non-noble metals applied in the process of the invention generally ranges from 10:1–1:10 and preferably from 3:1–1:3. The molar ratio of the different Group VIB metals to one another generally is not critical. The same holds when more than one Group VIII non-noble metal is applied. When molybdenum and tungsten are applied as Group VIB metals, the molybdenum:tungsten molar ratio preferably lies in the range of 9:1–1:19, more preferably 3:1–1:9, most preferably 3:1–1:6.

If the protic liquid is water, the solubility of the Group VIII non-noble metal components and Group VIB metal components which are at least partly in the solid state during the process of the invention generally is less than 0.05 mol/(100 ml water at 18° C.). This may be contrasted with the high solubility of the selected compounds of GB 1 282 950.

If the protic liquid is water, suitable Group VIII non-noble metal components which are at least partly in the solid state during the process of the invention comprise Group VIII non-noble metal components with a low solubility in water such as citrates, oxalates, carbonates, hydroxy-carbonates, hydroxides, phosphates, phosphides, sulfides, aluminates, molybdates, tungstates, oxides, or mixtures thereof. Preferably, Group VIII non-noble metal components which are at least partly in the solid state during the process of the invention comprise, and more preferably consist essentially of, oxalates, carbonates, hydroxy-carbonates, hydroxides, phosphates, molybdates, tungstates, oxides, or mixtures thereof, with hydroxy-carbonates and carbonates being most preferred. Generally, the molar ratio between the hydroxy groups and the carbonate groups in the hydroxy-carbonate lies in the range of 0–4, preferably 0–2, more preferably 0–1 and most preferably 0.1–0.8. Most preferably, the Group VIII non-noble metal component which is at least partly in the solid state during the process of the invention is a Group VIII non-noble metal salt.

If the protic liquid is water, suitable nickel and cobalt components which are at least partly in the solid state during the process of the invention comprise water-insoluble nickel or cobalt components such as oxalates, citrates, aluminates, carbonates, hydroxy-carbonates, hydroxides, molybdates, phosphates, phosphides, sulfides, tungstates, oxides, or mixtures thereof of nickel and/or cobalt. Preferably, the nickel or cobalt component comprises, and more preferably consists essentially, of oxalates, citrates, carbonates, hydroxy-carbonates, hydroxides, molybdates, phosphates, tungstates, oxides, or mixtures thereof of nickel and/or cobalt, with nickel and/or cobalt hydroxy-carbonate, nickel and/or cobalt hydroxide, nickel and/or cobalt carbonate, or mixtures thereof being most preferred. Generally, the molar ratio between the hydroxy groups and the carbonate groups in the nickel or cobalt or nickel-cobalt hydroxy-carbonate lies in the range of 0–4, preferably 0–2, more preferably 0–1 and most preferably 0.1–0.8. Suitable iron components which are at least partly in the solid state are iron(II) citrate, iron carbonate, hydroxy-carbonate, hydroxide, phosphate, phosphide, sulphide, oxide, or mixtures thereof, with iron(II) citrate, iron carbonate, hydroxy-carbonate, hydroxide, phosphate, phosphide, oxide, or mixtures thereof being preferred.

If the protic liquid is water, suitable Group VIB metal components which are at least partly in the solid state during contacting comprise Group VIB metal components with a low solubility in water, such as di- and trioxides, carbides, nitrides, aluminium salts, acids, sulfides, or mixtures thereof. Preferred Group VIB metal components which are at least partly in the solid state during contacting comprise, and preferably consist essentially of, di- and trioxides, acids, or mixtures thereof.

Suitable molybdenum components which are at least partly in the solid state during the process of the invention comprise water-insoluble molybdenum components such as molybdenum di- and trioxide, molybdenum sulphide, molybdenum carbide, molybdenum nitride, aluminium molybdate, molybdic acids (e.g. $H_2MoO_4$), ammonium phosphomolybdate, or mixtures thereof, with molybdic acid and molybdenum di- and trioxide being preferred Finally, suitable tungsten components which are at least partly in the solid state during the process of the invention comprise water-insoluble tungsten compounds, such as tungsten di- and trioxide, tungsten sulphide ($WS_2$ and $WS_3$), tungsten carbide, ortho-tungstic acid ($H_2WO_4*H_2O$), tungsten nitride, aluminium tungstate (also meta- or polytungstate), ammonium phosphotungstate, or mixtures thereof, with ortho-tungstic acid and tungsten di- and trioxide being preferred.

All the above components generally are commercially available or can be prepared by, e.g., precipitation. E.g., nickel hydroxy-carbonate can be prepared from a nickel chloride, sulphate, or nitrate solution by adding an appropriate amount of sodium carbonate. It is generally known to the skilled person to choose the precipitation conditions in such a way as to obtain the desired morphology and texture.

In general, metal components which mainly contain C, O and/or H beside the metal are preferred because they are less detrimental to the environment. Group VIII non-noble metal carbonates and hydroxy-carbonate are preferred metal components to be added at least partly in the solid state because when carbonate or hydroxy-carbonate is applied, $CO_2$ evolves and positively influences the pH of the reaction mixture. Further, because the carbonate is transformed into $CO_2$ and does not end up in the waste water, it is possible to recycle the waste water. Further, in this case no washing step is necessary to remove undesired anions from the resulting bulk catalyst particles.

Preferred Group VIII non-noble metal components to be added in the solute state comprise water-soluble Group VIII non-noble metal salts, such as nitrates, sulphates, acetates, chlorides, formates, hypophosphites and mixtures thereof. Examples include water-soluble nickel and/or cobalt components, e.g., water-soluble nickel and/or cobalt salts such as nitrates, sulphates, acetates, chlorides, formates, or mixtures thereof of nickel and/or cobalt as well as nickel hypophosphite. Suitable iron components to be added in the solute state comprise iron acetate, chloride, formate, nitrate, sulphate, or mixtures thereof.

Suitable Group VIB metal components to be added in the solute state include water-soluble Group VIB metal salts such as normal ammonium or alkali metal monomolybdates and tungstates as well as water-soluble isopoly-compounds of molybdenum and tungsten, such as metatungstic acid, or water-soluble heteropoly compounds of molybdenum or tungsten further comprising, e.g., P, Si, Ni, or Co or combinations thereof. Suitable water-soluble isopoly- and heteropoly compounds are given in *Molybdenum Chemicals,* Chemical data series, Bulletin Cdb-14, February 1969 and in *Molybdenum Chemicals,* Chemical data series, Bulletin Cdb-12a-revised, November 1969. Suitable water-soluble chromium compounds are, e.g., normal chromates, isopolychromates and ammonium chromium sulphate.

Preferred combinations of metal components are a Group VIII non-noble metal hydroxy-carbonate and/or carbonate, such as nickel or cobalt hydroxy-carbonate and/or carbonate, with a Group VIB metal oxide and/or a Group VIB acid, such as the combination of tungstic acid and molybdenum oxide, or the combination of molybdenum trioxide and tungsten trioxide, or a Group VIII hydroxy-carbonate and/or carbonate, such as nickel or cobalt hydroxy carbonate and/or carbonate, with Group VIB metal salts, such as ammonium dimolybdate, ammonium heptamolybdate, and ammonium metatungstate. It is within the capability of the skilled person to select further suitable combinations of metal components.

It has been found that the morphology and the texture of the metal component or components which remain at least partly in the solid state during the process of the invention can be retained during the process of the present invention. Consequently, by applying metal component particles with a certain morphology and texture, the morphology and the texture of the bulk catalyst particles contained in the final catalyst composition can be controlled at least to some extent. "Morphology and texture" in the sense of the present invention refer to pore volume, pore size distribution, surface area, particle form and particle size. The "bulk catalyst particles" contained in the final catalyst composition will be described under the heading "Catalyst composition of the present invention."

Generally the surface area of the oxidic bulk catalyst particles is at least 60%, preferably at least 70%, and more preferably at least 80% of the surface area of the metal component which remains at least partly in the solid state during the process of the invention. The surface area is expressed in this case as surface area per weight of this metal component, calculated as metal oxide. Further, the median pore diameter (determined by nitrogen adsorption) of the oxidic bulk catalyst particles generally is at least 40% and preferably at least 50% of the median pore diameter of the metal component which remains at least partly in the solid state during the process of the invention. Furthermore, the pore volume (determined by nitrogen adsorption) in the oxidic catalyst particles generally is at least 40% and preferably at least 50% of the pore volume of the metal component which remains at least partly in the solid state during the process of the invention, with the pore volume being expressed in volume of pores per weight of this metal component, calculated as metal oxide.

The retainment of the particle size generally is dependent on the extent of mechanical damage undergone by the oxidic bulk catalyst particles during processing, especially during steps such as mixing or kneading. The particle diameter can be retained to a high extent if these treatments are short and gentle. In this case, the median particle diameter of the oxidic bulk catalyst particles generally is at least 80% and preferably at least 90% of the median particle diameter of the metal component which remains at least partly in the solid state during the process of the invention. The particle size can also be affected by treatments such as spray-drying, especially if further materials are present. It is within the capability of the skilled person to select suitable conditions in order to control the particle size distribution during such treatments.

When a metal component which is added at least partly in the solid state and which has a large median particle diameter is selected, it is thought that the other metal components will only react with the outer layer of the large metal component particle. In this case, so-called "core-shell" structured bulk catalyst particles result.

An appropriate morphology and texture of the metal component(s) can be achieved either by applying suitable preformed metal components or by preparing these metal components by means of the above-described precipitation or re-crystallization or any other technique known by the skilled person under such conditions that a suitable morphology and texture are obtained. A proper selection of appropriate precipitation conditions can be made by routine experimentation.

To obtain a final catalyst composition with high catalytic activity, it is preferred that the metal component or components which are at least partly in the solid state during the process of the invention are porous metal components. It is desired that the total pore volume and the pore size distribution of these metal components are similar to those of conventional hydroprocessing catalysts. Conventional hydroprocessing catalysts generally have a pore volume of 0.05–5 ml/g, preferably of 0.1–4 ml/g, more preferably of 0.1–3 ml/g, and most preferably of 0.1–2 ml/g, as determined by mercury or water porosimetry. Further, conventional hydroprocessing catalysts generally have a surface area of at least 10 m$^2$/g, more preferably of at least 50 m$^2$/g, and most preferably of at least 100 m$^2$/g, as determined via the B.E.T. method.

The median particle diameter of the metal component or components which are at least partly in the solid state during the process of the invention preferably is in the range of at least 0.5 μm, more preferably at least 1 μm, most preferably at least 2 μ, but preferably not more than 5000 μm, more preferably not more than 1000 μm, even more preferably not more than 500 μm, and most preferably not more than 150 μm. Even more preferably, the median particle diameter lies in the range of 1–150 μm and most preferably in the range of 2–150 μm. Generally, the smaller the particle size of the metal components, the higher their reactivity. Therefore, metal components with particle sizes below the preferred lower limits are in principle a preferred embodiment of the present invention. However, for health, safety, and environmental reasons, the handling of such small particles requires special precautions.

In the following, preferred process conditions during the combination of the metal components and the (subsequent) reaction step will be described:

a) Combination of the Metal Components:

The process conditions during the combination of the metal components generally are not critical. It is possible to add all components at ambient temperature at their natural pH (if a suspension or solution is applied). Generally, it is of course preferred to keep the temperature of the metal components to be added below the atmospheric boiling point of the reaction mixture to ensure easy handling of the components during the addition. However, if desired, also temperatures above the atmospheric boiling point of the reaction mixture or different pH values can be applied. If the reaction step is carried out at increased temperature, the suspensions and optionally solutions which are added to the reaction mixture generally can be pre-heated to an increased temperature which can be equal to the reaction temperature. As has been mentioned above, the addition of one or more metal components can also be carried out while already combined metal components react with each other. In this case, the combination of the metal components and the reaction thereof overlap and constitute a single process step.

b) reaction Step:

During and/or after their addition, the metal components generally are agitated at a certain temperature for a certain period of time to allow the reaction to take place. The reaction temperature preferably is in the range of 0°–300° C., more preferably 50°–300° C., even more preferably 70°–200° C., and most preferably in the range of 70°–180° C. If the temperature is below the atmospheric boiling point of the reaction mixture, the process generally is carried out at atmospheric pressure. Above this temperature, the reaction generally is carried out at increased pressure, preferably in an autoclave and/or static mixer.

Generally, the mixture is kept at its natural pH during the reaction step. The pH preferably is in the range of 0–12, more preferably in the range of 1–10, and even more preferably in the range of 3–8. As has been set out above, care must be taken that the pH and the temperature are chosen in such a way that not all the metals are dissolved during the reaction step.

The reaction time generally lies in the range of 1 minute to several days, more preferably in the range of 1 minute to 24 hours, and most preferably in the range of 5 minutes to 20 hours. As has been mentioned above, the reaction time depends on the temperature.

After the reaction step, if necessary, the solid can be separated from the liquid, e.g., via filtration.

The process of the present invention can be carried out both as a batch process and as a continuous process.

If so desired, a material selected from the group of binder materials, conventional hydroprocessing catalysts, cracking components, or mixtures thereof can be added during the above-described preparation of the bulk catalyst particles or to the particles after their preparation, as will be elucidated below. Details in respect of these materials are given below under heading (B).

For this process embodiment, the following options are available: the Group VIB and Group VIII non-noble metal components can generally be combined with any of the above materials either prior to or during the reaction of the metal components. They can, e.g., be added to the material either simultaneously or one after the other. Alternatively, the Group VIB and Group VIII non-noble metal components can be combined as described above, and subsequently a material can be added to the combined metal components. It is further possible to combine part of the Group VIB and Group VIII non-noble metal components either simultaneously or one after the other, to subsequently add the material, and to finally add the rest of the Group VIB and Group VIII non-noble metal components either simultaneously or one after the other. For instance, a Group VIB or Group VIII non-noble metal component which is at least partly in the solid state during the process of the invention can be first mixed and if desired shaped with the material and, subsequently, further Group VIB and/or Group VIII non-noble metal component(s) can be added to the optionally shaped mixture. However, it is also possible to combine the material with Group VIB and Group VIII non-noble metal component(s) in the solute state and to subsequently add a metal component at least partly in the solid state. Finally, simultaneous addition of the metal components and the material is possible.

As stated above, the material to be added during the preparation of the bulk catalyst particles can be a binder material. Binder material according to the present invention means a binder and/or a precursor thereof. If a precursor is added in the form of a solution, care must be taken that the binder is converted to the solid state during the process of the invention. This can be done by adjusting the pH conditions in such a way that precipitation of the binder occurs. Suitable conditions for the precipitation of the binder are known to the skilled person and need no further explanation. If the amount of liquid of the resulting catalyst composition is too high, optionally a solid-liquid separation can be carried out.

Additionally, further materials such as phosphorus-containing compounds, boron-containing compounds, silicon-containing compounds, fluorine-containing compounds, additional transition metals, rare earth metals, or mixtures thereof can be added during the preparation of the bulk catalyst particles in a similar way to that described for the above materials. Details in respect of these further materials are given below.

It is noted that irrespective of whether any of the above (further) materials are added during the preparation of the particles, the particles resulting from the process described above under (A) will be denoted as "bulk catalyst particles" in the present invention.

(B) Subsequent Process Steps

Preferably, the bulk catalyst particles either as such or comprising any of the above (further) materials are subjected to one or more of the following process steps of
(i) compositing with a material selected from the group of binder materials, conventional hydroprocessing catalysts, cracking components, or mixtures thereof,
(ii) spray-drying, (flash) drying, milling, kneading, slurry-mixing, dry or wet mixing, or combinations thereof,
(iii) shaping,
(iv) drying and/or thermally treating, and
(v) sulfiding.

These process steps will be explained in more detail in the following:

Process Step (i)

The material can be added in the dry state, either thermally treated or not, in the wetted and/or suspended state and/or as a solution.

The material can be added during the preparation of the bulk catalyst particles (see above), subsequent to the preparation of the bulk catalyst composition but prior to any step (ii) and/or during and/or subsequent to any step (ii) but prior to any shaping step (iii).

Preferably, the material is added subsequent to the preparation of the bulk catalyst particles and prior to spray-drying or any alternative technique, or, if spray-drying or the alternative techniques are not applied, prior to shaping.

Optionally, the bulk catalyst composition prepared as described above can be subjected to a solid-liquid separation before being composited with the material. After solid-liquid separation, optionally, a washing step can be included. Further, it is possible to thermally treat the bulk catalyst composition after an optional solid-liquid separation and drying step and prior to its being composited with the material.

In all the above-described process alternatives, the term "compositing the bulk catalyst composition with a material" means that the material is added to the bulk catalyst composition or vice versa and the resulting composition is mixed. Mixing is preferably done in the presence of a liquid ("wet mixing"). This improves the mechanical strength of the final catalyst composition.

It has been found that compositing the bulk catalyst particles with the material and/or incorporating the material during the preparation of the bulk catalyst particles leads to bulk catalyst compositions of particularly high mechanical strength, in particular if the median particle size of the bulk catalyst particles is in the range of at least 0.5 $\mu$m, more preferably at least 1 $\mu$m, most preferably at least 2 $\mu$m, but preferably not more than 5000 $\mu$m, more preferably not more than 1000 $\mu$m, even more preferably not more than 500 $\mu$m, and most preferably not more than 150 $\mu$m. Even more preferably, the median particle diameter lies in the range of 1–150 $\mu$m and most preferably in the range of 2–150 $\mu$m.

The compositing of the bulk catalyst particles with the material results in bulk catalyst particles embedded in this material or vice versa. Normally, the morphology of the bulk catalyst particles is essentially maintained in the resulting catalyst composition.

As stated above, the material may be selected from a binder material, a conventional hydroprocessing catalyst, a cracking component, or mixtures thereof. These materials will be described in more detail below.

The binder materials to be applied may be any materials conventionally applied as binders in hydroprocessing catalysts. Examples are silica, silica-alumina, such as conventional silica-alumina, silica-coated alumina and alumina-coated silica, alumina such as (pseudo) boehmite, or gibbsite, titania, titania-coated alumina, zirconia, cationic clays or anionic clays such as saponite, bentonite, kaolin, sepiolite or hydrotalcite, or mixtures thereof. Preferred binders are silica, silica-alumina, alumina, titania, titania-coated alumina, zirconia, bentonite, or mixtures thereof. These binders may be applied as such or after peptization.

It is also possible to apply precursors of these binders which during the process of the invention are converted into any of the above-described binders. Suitable precursors are, e.g., alkali metal aluminates (to obtain an alumina binder), water glass (to obtain a silica binder), a mixture of alkali metal aluminates and water glass (to obtain a silica-alumina binder), a mixture of sources of a di-, tri- and/or tetravalent metal such as a mixture of water-soluble salts of magnesium, aluminium and/or silicon (to prepare a cationic clay and/or anionic clay), aluminium chlorohydrol, aluminium sulphate, aluminium nitrate, aluminium chloride, or mixtures thereof.

If desired, the binder material may be composited with a Group VIB metal-containing compound and/or a Group VIII non-noble metal-containing compound, prior to being composited with the bulk catalyst composition and/or prior to being added during the preparation thereof. Compositing the binder material with any of these metal-containing compounds may be carried out by impregnation of the binder with these materials. Suitable impregnation techniques are known to the person skilled in the art. If the binder is peptized, it is also possible to carry out the peptization in the presence of Group VIB and/or Group VIII non-noble metal containing compounds.

If alumina is applied as binder, the surface area of the alumina generally lies in the range of 50–600 m$^2$/g and preferably 100–450 m$^2$/g, as measured by the B.E.T. method. The pore volume of the alumina preferably is in the range of 0.1–1.5 ml/g, as measured by nitrogen adsorption. Before the characterization of the alumina, it is thermally treated at 600° C. for 1 hour.

Generally, the binder material to be added in the process of the invention has less catalytic activity than the bulk catalyst composition or no catalytic activity at all. Consequently, by adding a binder material, the activity of the bulk catalyst composition may be reduced. Furthermore, the addition of binder material leads to a considerable increase in the mechanical strength of the final catalyst composition. Therefore, the amount of binder material to be added in the process of the invention generally depends on the desired activity and/or desired mechanical strength of the final catalyst composition. Binder amounts from 0–95 wt % of the total composition can be suitable, depending on the envisaged catalytic application. However, to take advantage of the resulting unusually high activity of the composition of the present invention, the binder amounts to be added generally are in the range of 0–75 wt % of the total composition, preferably 0–50 wt %, more preferably 0–30 wt %.

Conventional hydroprocessing catalysts are, e.g., conventional hydro-desulfurization, hydrodenitrogenation, or hydrocracking catalysts. These catalysts can be added in the used, regenerated, fresh, or sulfided state. If desired, the conventional hydroprocessing catalyst may be milled or treated in any other conventional way before being applied in the process of the invention.

A cracking component according to the present invention is any conventional cracking component such as cationic clays, anionic clays, crystalline cracking components such as zeolites, e.g. ZSM-5, (ultra-stable) zeolite Y, zeolite X, ALPOs, SAPOs, MCM-41, amorphous cracking components such as silica-alumina, or mixtures thereof. It will be clear that some materials may act as binder and cracking component at the same time. For instance, silica-alumina may have a cracking and a binding function at the same time.

If desired, the cracking component may be composited with a Group VIB metal and/or a Group VIII non-noble metal prior to being composited with the bulk catalyst composition and/or prior to being added during the preparation thereof. Compositing the cracking component with any of these metals may take the form of impregnation of the cracking component with these materials.

Generally, it depends on the envisaged catalytic application of the final catalyst composition which of the above-described cracking components, if any, is added. A crystalline cracking component is preferably added if the resulting composition is to be applied in hydrocracking. Other cracking components such as silica-alumina or cationic clays are preferably added if the final catalyst composition is to be used in hydrotreating applications or mild hydrocracking. The amount of cracking material which is added depends on the desired activity of the final composition and the application envisaged, and thus may vary from 0 to 90 wt %, based on the total weight of the catalyst composition.

Optionally, further materials, such as phosphorus-containing compounds, boron-containing compounds, silicon-containing compounds, fluorine-containing compounds, additional transition metal compounds, rare earth metal compounds, or mixtures thereof, may be incorporated into the catalyst composition.

As phosphorus-containing compounds may be applied ammonium phosphate, phosphoric acid or organic phosphorus-containing compounds. Phosphorus-containing compounds can be added at any stage of the process of the present invention prior to the shaping step and/or subsequent to the shaping step. If the binder material is peptized, phosphorus-containing compounds can also be used for peptization. For instance, an alumina binder can be peptized by being contacted with phosphoric acid or with a mixture of phosphoric acid and nitric acid.

As boron-containing compounds may be applied, e.g., boric acid or heteropoly compounds of boron with molybdenum and/or tungsten and as fluorine-containing compounds may be applied, e.g., ammonium fluoride. Typical silicon-containing compounds are water glass, silica gel, tetraethylorthosilicate or heteropoly compounds of silicon with molybdenum and/or tungsten. Further, compounds such as fluorosilicic acid, fluoroboric acid, difluorophosphoric acid or hexafluorophosphoric acid may be applied if a combination of F with Si, B and P, respectively, is desired.

Suitable additional transition metals are, e.g., rhenium, manganese, ruthenium, rhodium, iridium, chromium, vanadium, iron, platinum, palladium, titanium, zirconium, niobium, cobalt, nickel, molybdenum, or tungsten. These metals can be added at any stage of the process of the present invention prior to the shaping step. Apart from adding these metals during the process of the invention, it is also possible to composite the final catalyst composition therewith. Thus it is possible to impregnate the final catalyst composition with an impregnation solution comprising any of these metals.

Process Step (ii)

The bulk catalyst particles optionally comprising any of the above (further) materials can be subjected to spray-drying, (flash) drying, milling, kneading, slurry-mixing, dry or wet mixing, or combinations thereof, with a combination of wet mixing and kneading or slurry mixing and spray-drying being preferred.

These techniques can be applied either before or after any of the above (further) materials are added (if at all), after solid-liquid separation, before or after a thermal treatment, and subsequent to re-wetting.

Preferably, the bulk catalyst particles are both composited with any of the above materials and subjected to any of the above techniques. It is believed that by applying any of the above-described techniques of spray-drying, (flash) drying, milling, kneading, slurry-mixing, dry or wet mixing, or combinations thereof, the degree of mixing between the bulk catalyst composition and any of the above materials is improved. This applies to cases where the material is added before as well as after the application of any of the above-described methods. However, it is generally preferred to add the material prior to step (ii). If the material is added subsequent to step (ii), the resulting composition preferably is thoroughly mixed by any conventional technique prior to any further process steps such as shaping. An advantage of, e.g., spray-drying is that no waste water streams are obtained when this technique is applied.

Spray-drying typically is carried out at an outlet temperature in the range of 100°–200° C. and preferably 120°–180° C.

Dry mixing means mixing the bulk catalyst particles in the dry state with any of the above materials in the dry state. Wet mixing, e.g., comprises mixing the wet filter cake comprising the bulk catalyst particles and optionally any of the above materials as powders or wet filter cake to form a homogenous paste thereof.

Process Step (iii)

If so desired, the bulk catalyst optionally comprising any of the above (further) materials may be shaped optionally after step (ii) having been applied. Shaping comprises extrusion, pelletizing, beading and/or spray-drying. It must be noted that if the catalyst composition is to be applied in slurry-type reactors, fluidized beds, moving beds, or expanded beds, generally spray-drying or beading is applied. For fixed bed or ebullating bed applications, generally the catalyst composition is extruded, pelletized and/or beaded. In the latter case, at any stage prior to or during the shaping step, any additives which are conventionally used to facilitate shaping can be added. These additives may comprise aluminium stearate, surfactants, graphite, starch, methyl cellulose, bentonite, polyethylene glycols, polyethylene oxides, or mixtures thereof. Further, when alumina is used as binder, it may be desirable to add acids such as nitric acid prior to the shaping step to increase the mechanical strength of the extrudates.

If the shaping comprises extrusion, beading and/or spray-drying, it is preferred that the shaping step is carried out in the presence of a liquid, such as water. Preferably, for extrusion and/or beading, the amount of liquid in the shaping mixture, expressed as LOI, is in the range of 20–80%.

If so desired, coaxial extrusion of any of the above materials with the bulk catalyst particles, optionally comprising any of the above materials, may be applied. More in particular, two mixtures can be co-extruded, in which case the bulk catalyst particles optionally comprising any of the above materials are present in the inner extrusion medium while any of the above materials without the bulk catalyst particles is present in the outer extrusion medium or vice versa.

Step (iv)

After an optional drying step, preferably above 100° C., the resulting shaped catalyst composition may be thermally treated if desired. A thermal treatment, however, is not essential to the process of the invention. A "thermal treatment" according to the present invention refers to a treatment performed at a temperature of, e.g., from 100°–600° C., preferably from 150° to 550° C., more preferably 150° C. –450° C., for a time varying from 0.5 to 48 hours in an inert gas such as nitrogen, or in an oxygen-containing gas, such as air or pure oxygen. The thermal treatment can be carried out in the presence of water steam.

In all the above process steps the amount of liquid must be controlled. If, e.g., prior to subjecting the catalyst composition to spray-drying the amount of liquid is too low, additional liquid must be added. If, on the other hand, e.g., prior to extrusion of the catalyst composition the amount of liquid is too high, the amount of liquid must be reduced by, e.g., solid-liquid separation via, e.g., filtration, decantation, or evaporation and, if necessary, the resulting material can be dried and subsequently re-wetted to a certain extent. For all the above process steps, it is within the scope of the skilled person to control the amount of liquid appropriately.

Process Step (v)

The process of the present invention may further comprise a sulfidation step. Sulfidation generally is carried out by contacting the bulk catalyst particles directly after their preparation or after any one of process steps (i)–(iv) with a sulfur-containing compound such as elementary sulfur, hydrogen sulphide, DMDS, or polysulfides. The sulfidation step can be carried out in the liquid and the gaseous phase. The sulfidation can be carried out subsequent to the preparation of the bulk catalyst composition but prior to step (i) and/or subsequent to step (i) but prior to step (ii) and/or subsequent to step (ii) but prior to step (iii) and/or subsequent to step (iii) but prior to step (iv) and/or subsequent to step (iv). It is preferred that the sulfidation is not carried out prior to any process step by which the obtained metal sulfides revert to their oxides. Such process steps are, e.g., a thermal treatment or spray-drying or any other high-temperature treatment if carried out under an oxygen-containing atmosphere. Consequently, if the catalyst composition is subjected to spray-drying and/or any alternative technique or to a thermal treatment under an oxygen-containing atmosphere, the sulfidation preferably is carried out subsequent to the application of any of these methods. Of course, if these methods are applied under an inert atmosphere, sulfidation can also be carried out prior to these methods.

If the catalyst composition is used in fixed bed processes, the sulfidation preferably is carried out subsequent to the shaping step and, if applied, subsequent to the last thermal treatment in an oxidizing atmosphere.

The sulfidation can generally be carried out in situ and/or ex situ. Preferably, the sulfidation is carried out ex situ, i.e. the sulfidation is carried out in a separate reactor prior to the sulfided catalyst composition being loaded into the hydroprocessing unit. Furthermore, it is preferred that the catalyst composition is sulfided both ex situ and in situ.

A preferred process of the present invention comprises the following successive process steps of preparing the bulk catalyst particles as described above, slurry mixing the obtained bulk catalyst particles with, e.g., a binder, spray drying the resulting composition, rewetting, kneading, extrusion, drying, calcining and sulfiding. Another preferred process embodiment comprises the following successive steps of preparing the bulk catalyst particles as described above, isolating the particles via filtration, wet mixing the filter cake with a material, such as a binder, kneading, extrusion, drying, calcining and sulfiding.

Catalyst Composition of the Invention

The invention further pertains to a catalyst composition obtainable by the above-described process. Preferably, the invention pertains to a catalyst composition obtainable by process step (A) and optionally one or more of process steps B(i)–(iv) described above.

In a preferred embodiment, the invention pertains to a catalyst composition obtainable by the above-described process wherein the morphology of the metal component(s) which are at least partly in the solid state during the process is retained in the catalyst composition. This retention of morphology is described in detail under the heading "Process of the present invention."

(a) Oxidic Catalyst Composition

Furthermore, the invention pertains to a catalyst composition comprising bulk catalyst particles which comprise at least one Group VIII non-noble metal and at least two Group VIB metals, wherein the metals are present in the catalyst composition in their oxidic state, and wherein the characteristic full width at half maximum does not exceed 2.5° when the Group VIB metals are molybdenum, tungsten, and, optionally, chromium, or does not exceed 4.0° when the Group VIB metals are molybdenum and chromium or tungsten and chromium.

As described in the chapter "characterization methods", the characteristic full width at half maximum is determined on the basis of the peak located at $2\theta=53.6°$ ($\pm0.7°$) (when the Group VIB metals are molybdenum, tungsten and optionally chromium or when the Group VIB metals are tungsten and chromium) or at $2\theta=63.5°$ ($\pm0.6°$) (when the Group VIB metals are molybdenum and chromium).

Preferably, the characteristic full width at half maximum does not exceed 2.2°, more preferably 2.0°, still more preferably 1.8°, and most preferably it does not exceed 1.6° (when the Group VIB metals are molybdenum, tungsten, and, optionally, chromium) or it does not exceed 3.5°, more preferably 3.0°, still more preferably 2.5°, and most preferably 2.0° (when the Group VIB metals are molybdenum and chromium or tungsten and chromium).

Preferably, the X-ray diffraction pattern shows two peaks at the positions 2θ=38.7° (±0.6°) and 40.8° (±0.7°) (these peaks will be referred to as doublet P) and/or two peaks at the positions 2θ=61.1° (±1.5°) and 64.1° (±1.2°) (these peaks will be referred to as doublet Q) when the Group VIB metals are molybdenum, tungsten, and, optionally, chromium.

From the characteristic full width at half maximum of the oxidic catalyst compositions of the present invention and, optionally, the presence of at least one of the two doublets P and Q, it can be deduced that the microstructure of the catalyst of the present invention differs from that of corresponding catalysts prepared via co-precipitation as described in WO 9903578 or U.S. Pat. No. 3,678,124.

Typical X-ray diffraction patterns are described in the examples.

The X-ray diffraction pattern of the bulk catalyst particles preferably does not contain any peaks characteristic to the metal components to be reacted. Of course, if desired, it is also possible to choose the amounts of metal components in such a way as to obtain bulk catalyst particles characterized by an X-ray diffraction pattern still comprising one or more peaks characteristic to at least one of these metal components. If, e.g., a high amount of the metal component which is at least partly in the solid state during the process of the invention is added, or if this metal component is added in the form of large particles, small amounts of this metal component may be traced in the X-ray diffraction pattern of the resulting bulk catalyst particles.

The molar ratio of Group VIB to Group VIII non-noble metals generally ranges from 10:1–1:10 and preferably from 3:1–1:3. In the case of a core-shell structured particle, these ratios of course apply to the metals contained in the shell. The ratio of the different Group VIB metals to one another generally is not critical. The same holds when more than one Group VIII non-noble metal is applied. In cases where molybdenum and tungsten are present as Group VIB metals, the molybenum:tungsten ratio preferably lies in the range of 9:1–1:19, more preferably 3:1–1:9, most preferably 3:1–1:6.

The bulk catalyst particles comprise at least one Group VIII non-noble metal component and at least two Group VIB metal components. Suitable Group VIB metals include chromium, molybdenum, tungsten, or mixtures thereof, with a combination of molybdenum and tungsten being most preferred. Suitable Group VIII non-noble metals include iron, cobalt, nickel, or mixtures thereof, preferably nickel and/or cobalt. Preferably, a combination of metals comprising nickel, molybdenum, and tungsten or nickel, cobalt, molybdenum, and tungsten, or cobalt, molybdenum, and tungsten is contained in the bulk catalyst particles of the invention.

Preferably, the oxidic bulk catalyst particles comprised in these catalyst compositions have a B.E.T. surface area of at least 10 m²/g, more preferably of at least 50 m²/g, and most preferably of at least 80 m²/g, as measured via the B.E.T. method.

If during the preparation of the bulk catalyst particles none of the above (further) materials, such as a binder material, a cracking component or a conventional hydroprocessing catalyst, have been added, the bulk catalyst particles will comprise about 100 wt % of Group VIB and Group VIII non-noble metals. If any of the above materials have been added during the preparation of the bulk catalyst particles, they will preferably comprise 50–100 wt %, and more preferably 70–100 wt % of the Group VIB and Group VIII non-noble metals, calculated as oxides and based on the total weight of the bulk catalyst particles, the balance being any of the above-mentioned (further) materials. The amount of Group VIB and Group VIII non-noble metals can be determined via TEM-EDX, AAS or ICP.

The median pore diameter (50% of the pore volume is below said diameter, the other 50% above it) of the oxidic bulk catalyst particles preferably is 3–25 nm, more preferably 5–15 nm (determined by $N_2$ adsorption).

The total pore volume of the oxidic bulk catalyst particles preferably is at least 0.05 ml/g and more preferably at least 0.1 ml/g, as determined by $N_2$ adsorption.

It is desired that the pore size distribution of the bulk catalyst particles is approximately the same as that of conventional hydroprocessing catalysts. More in particular, the bulk catalyst particles preferably have a median pore diameter of 3–25 nm, as determined by nitrogen adsorption, a pore volume of 0.05–5 ml/g, more preferably of 0.1–4 ml/g, still more preferably of 0.1–3 ml/g, and most preferably of 0.1–2 ml/g, as determined by nitrogen adsorption.

Furthermore, these bulk catalyst particles preferably have a median particle size in the range of at least 0.5 μm, more preferably at least 1 μm, most preferably at least 2 μm, but preferably not more than 5000 μm, more preferably not more than 1000 μm, even more preferably not more than 500 μm, and most preferably not more than 150 μm. Even more preferably, the median particle diameter lies in the range of 1–150 μm and most preferably in the range of 2–150 μm.

As has been mentioned above, if so desired, it is possible to prepare core-shell structured bulk catalyst particles using the process of the invention. In these particles, at least one of the metals is anisotropically distributed in the bulk catalyst particles. The concentration of a metal, the metal component of which is at least partly in the solid state during the process of the invention, generally is higher in the inner part, i.e., the core of the final bulk catalyst particles, than in the outer part, i.e. the shell of the final bulk catalyst particles. Generally, the concentration of this metal in the shell of the final bulk catalyst particles is at most 95% and in most cases at most 90% of the concentration of this metal in the core of the final bulk catalyst particles. Further, it has been found that the metal of a metal component which is applied in the solute state during the process of the invention is also anisotropically distributed in the final bulk catalyst particles. More in particular, the concentration of this metal in the core of the final bulk catalyst particles generally is lower than the concentration of this metal in the shell. Still more in particular, the concentration of this metal in the core of the final bulk catalyst particles is at most 80% and frequently at most 70% and often at most 60% of the concentration of this metal in the shell. It must be noted that the above-described anisotropic metal distributions, if any, can be found in the catalyst composition of the invention irrespective of whether the catalyst composition has been thermally treated and/or sulfided. In the above cases, the shell generally has a thickness of 10–1,000 nm.

Though the above anisotropic metal distribution can be achieved with the process of the invention, the Group VIB and Group VIII non-noble metals generally are homogeneously distributed in the bulk catalyst particles. This embodiment generally is preferred.

Preferably, the catalyst composition additionally comprises a suitable binder material. Suitable binder materials preferably are those described above. The particles generally are embedded in the binder material, which functions as a glue to hold the particles together. Preferably, the particles are homogeneously distributed within the binder. The presence of the binder generally leads to an increased mechanical strength of the final catalyst composition. Generally, the catalyst composition of the invention has a mechanical strength, expressed as side crush strength, of at least 1 lbs/mm and preferably of at least 3 lbs/mm (measured on extrudates with a diameter of 1–2 mm).

The amount of binder depends, int. al., on the desired activity of the catalyst composition. Binder amounts from 0–95 wt % of the total composition can be suitable, depending on the envisaged catalytic application. However, to take advantage of the unusually high activity of the composition of the present invention, the binder amounts generally are in the range of 0–75 wt % of the total composition, preferably 0–50 wt %, more preferably 0–30 wt %.

If desired, the catalyst composition may comprise a suitable cracking component. Suitable cracking components preferably are those described above. The amount of cracking component preferably is in the range of 0–90 wt %, based on the total weight of the catalyst composition.

Moreover, the catalyst composition may comprise conventional hydroprocessing catalysts. The conventional hydroprocessing catalyst generally comprises any of the above-described binder materials and cracking components. The hydrogenation metals of the conventional hydroprocessing catalyst generally comprise Group VIB and Group VIII non-noble metals such as combinations of nickel or cobalt with molybdenum or tungsten. Suitable conventional hydroprocessing catalysts are, e.g., hydrotreating or hydrocracking catalysts. These catalysts can be in the used, regenerated, fresh, or sulfided state.

Furthermore, the catalyst composition may comprise any further material which is conventionally present in hydroprocessing catalysts such as phosphorus-containing compounds, boron-containing compounds, silicon-containing compounds, fluorine-containing compounds, additional transition metals, rare earth metals, or mixtures thereof. Details in respect of these further materials are given above. The transition or rare earth metals generally are present in the oxidic form when the catalyst composition has been thermally treated in an oxidizing atmosphere and/or in the sulfided form when the catalyst composition has been sulfided.

To obtain catalyst compositions with high mechanical strength, it may be desirable for the catalyst composition of the invention to have a low macroporosity. Preferably, less than 30% of the pore volume of the catalyst composition is in pores with a diameter higher than 100 nm (determined by mercury intrusion, contact angle: 130°), more preferably less than 20%.

The oxidic catalyst composition of the present invention generally comprises 10–100 wt %, preferably 25–100 wt %, more preferably 45–100 wt % and most preferably 65–100 wt % of Group VIB and Group VIII non-noble metals, based on the total weight of the catalyst composition, calculated as metal oxides.

It is noted that a catalyst prepared via stepwise impregnation with Group VIB and Group VIII non-noble metal solutions on an alumina carrier as described in JP 09000929 does not comprise any bulk catalyst particles and thus has a morphology which is completely different from that of the present invention.

(b) Sulfided Catalyst Composition

If so desired, the catalyst composition of the present invention can be sulfided. Consequently, the present invention further pertains to a catalyst composition comprising sulfidic bulk catalyst particles which comprise at least one Group VIII non-noble metal and at least two Group VIB metals and wherein the degree of sulfidation under conditions of use does not exceed 90%.

It will be clear that the above sulfided catalyst composition may comprise any of the above-described (further) materials.

The present invention further pertains to a shaped and sulfided catalyst composition comprising
(i) sulfidic bulk catalyst particles comprising at least one Group VIII non-noble metal and at least two Group VIB metals, wherein the degree of sulfidation under conditions of use does not exceed 90% and
(ii) a material selected from the group of binder materials, conventional hydroprocessing catalysts, cracking components, or mixtures thereof.

It is essential that the degree of sulfidation of the sulfidic bulk catalyst particles under conditions of use does not exceed 90%. Preferably, the degree of sulfidation under conditions of use is in the range of 10–90%, more preferably of 20–90%, and most preferably of 40–90%. The degree of sulfidation is determined as described in the chapter "characterization methods."

If conventional sulfidation techniques are applied in the process of the present invention, the degree of sulfidation of the sulfidic bulk catalyst particles prior to use is essentially identical to the degree of sulfidation under conditions of use. However, if very specific sulfidation techniques are applied, it might be that the degree of sulfidation prior to the use of the catalyst is higher than during the use thereof, as during use part of the sulfides or elemental sulfur is removed from the catalyst. In this case the degree of sulfidation is the one that results during use of the catalyst and not prior thereto. The conditions of use are those described below in the chapter "use according to the invention." That the catalyst is "under conditions of use" means that it is subjected to these conditions for a time period long enough for the catalyst to reach equilibrium with its reaction environment.

It is further preferred that the catalyst composition of the present invention is essentially free of Group VIII non-noble metal disulfides. More in particular, the Group VIII non-noble metals are preferably present as (Group VIII non-noble metal)$_y$S$_x$, with x/y being in the range of 0.5–1.5

It is noted that the sulfidic catalyst compositions of the present invention have a much better catalytic performance than catalysts comprising one Group VIII non-noble metal and only one Group VIB metal.

The shaped and sulfided catalyst particles may have many different shapes. Suitable shapes include spheres, cylinders, rings, and symmetric or asymmetric polylobes, for instance tri- and quadrulobes. Particles resulting from extrusion, beading or pilling usually have a diameter in the range of 0.2 to 10 mm, and their length likewise is in the range of 0.5 to 20 mm. Particles resulting from spray-drying generally have a median particle diameter in the range of 1 $\mu$m–100 $\mu$m.

Details about the binder materials, cracking components, conventional hydro-processing catalysts, and any further materials as well as the amounts thereof are given above. Further, details in respect of the Group VIII non-noble metals and the Group VIB metals contained in the sulfided catalyst compositions and the amounts thereof are given above.

It is noted that the core-shell structure described above for the oxidic catalyst composition is not destroyed by sulfidation, i.e., the sulfided catalyst compositions may also comprise this core-shell structure.

It is further noted that the sulfided catalysts are at least partly crystalline materials, i.e., the X-ray diffraction pattern of the sulfided bulk catalyst particles generally comprises several crystalline peaks characteristic to the Group VIII non-noble metal and Group VIB metal sulfides.

As for the oxidic catalyst composition, preferably, less than 30% of the pore volume of the sulfidic catalyst composition is in pores with a diameter higher than 100 nm (determined by mercury intrusion, contact angle: 130°), more preferably less than 20%.

Generally, the median particle diameters of the sulfidic bulk catalyst particles are identical to those given above for the oxidic bulk catalyst particles.

Use According to the Invention

The catalyst composition according to the invention can be used in virtually all hydroprocessing processes to treat a plurality of feeds under wide-ranging reaction conditions, e.g., at temperatures in the range of 200° to 450° C., hydrogen pressures in the range of 5 to 300 bar, and space velocities (LHSV) in the range of 0.05 to 10 $h^{-1}$. The term "hydroprocessing" in this context encompasses all processes in which a hydrocarbon feed is reacted with hydrogen at elevated temperature and elevated pressure, including processes such as hydrogenation, hydrodesulfurization, hydrodenitrogenation, hydrodemetallization, hydrodearomatization, hydroisomerization, hydrodewaxing, hydrocracking, and hydrocracking under mild pressure conditions, which is commonly referred to as mild hydrocracking. The catalyst composition of the invention is particularly suitable for hydrotreating hydrocarbon feedstocks. Such hydrotreating processes comprise, e.g., hydrodesulfurization, hydrodenitrogenation, and hydrodearomatization of hydrocarbon feedstocks. Suitable feedstocks are, e.g., middle distillates, kero, naphtha, vacuum gas oils, and heavy gas oils. Conventional process conditions can be applied, such as temperatures in the range of 250°–450° C., pressures in the range of 5–250 bar, space velocities in the range of 0,1–10 $h^{-1}$, and $H_2$/oil ratios in the range of 50–2000 Nl/l.

Characterization Methods

1. Side Crush Strength Determination

First, the length of, e.g., an extrudate particle was measured, and then the extrudate particle was subjected to compressive loading (25 lbs in 8.6 sec.) by a movable piston. The force required to crush the particle was measured. The procedure was repeated with at least 40 extrudate particles and the average was calculated as force (lbs) per unit length (mm). The method preferably was applied to shaped particles with a length not exceeding 7 mm.

2. Pore Volume via N2 Adsorption

The $N_2$ adsorption measurement was carried out as described in the Ph.D. dissertation of J. C. P. Broekhoff (Delft University of Technology 1969).

3. Amount of Added Solid Metal Components

Qualitative determination: The presence of solid metal components during the process of the invention can easily be detected by visual inspection at least if the metal components are present in the form of particles with a diameter larger than the wavelength of visible light. Of course, methods such as quasi-elastic light scattering (QELS) or near-forward scattering, which are known to the skilled person, can also be used to verify that at no point in time during the process of the invention all metals will be in the solute state.

Quantitative determination: if the metal components which are added at least partly in the solid state are added as suspension(s), the amount of solid metal components added during the process of the invention can be determined by filtration of the suspension(s) to be added under the conditions which are applied during the addition (temperature, pH, pressure, amount of liquid), in such a way that all solid material contained in the suspension(s) is collected as solid filter cake. From the weight of the solid and dried filter cake, the weight of the solid metal components can be determined by standard techniques. Of course, if apart from solid metal components further solid components, such as a solid binder, are present in the filter cake, the weight of this solid and dried binder must be subtracted from the weight of the solid and dried filter cake.

The amount of solid metal components in the filter cake can also be determined by standard techniques such as atomic absorption spectroscopy (AAS), XRF, wet chemical analysis, or ICP.

If the metal components which are added at least partly in the solid state are added in the wetted or dry state, a filtration generally is not possible. In this case, the weight of the solid metal components is considered equal to the weight of the corresponding initially employed metal components, on a dry basis. The total weight of all metal components is the amount of all metal components initially employed, on a dry basis, calculated as metal oxides.

4. Characteristic Full Width at Half Maximum

The characteristic full width at half maximum of the oxidic catalysts was determined on the basis of the X-ray diffraction pattern of the catalysts using a linear background:

(a) if the Group VIB metals are molybdenum and tungsten: the characteristic full width at half maximum is the full width at half maximum (in terms of 2θ) of the peak at 2θ=53.6° (±0.7°)

(b) if the Group VIB metals are molybdenum and chromium: the characteristic full width at half maximum is the full width at half maximum (in terms of 2θ) of the peak at 2θ=63.5° (±0.6°)

(c) if the Group VIB metals are tungsten and chromium: the characteristic full width at half maximum is the full width at half maximum (in terms of 2θ) of the peak at 2θ=53.6° (±0.7°)

(d) if the Group VIB metals are molybdenum, tungsten, and chromium: the characteristic full width at half maximum is the full width at half maximum (in terms of 2θ) of the peak at 2θ=53.6° (±0.7°).

For the determination of the X-ray diffraction pattern, a standard powder diffractometer (e.g., Philips PW1050) equipped with a graphite monochromator can be used. The measurement conditions can, e.g., be chosen as follows:

X-ray generator settings: 40 kV and 40 mA
wavelength: 1.5418 angstroms
divergence and anti-scatter slits: 1°
detector slit: 0.2 mm,
step size: 0.04 (°2θ)
time/step: 20 seconds.

5. Degree of Sulfidation

Any sulfur contained in the sulfidic bulk catalyst composition was oxidized in an oxygen flow by heating in an induction oven. The resulting sulfur dioxide was analyzed using an infrared cell with a detection system based on the IR characteristics of the sulfur dioxide. To obtain the amount of sulfur the signals relating to sulfur dioxide are compared to those obtained on calibration with well-known standards. The degree of sulfidation is then calculated as the ratio between the amount of sulfur contained in the sulfidic bulk catalyst particles and the amount of sulfur that would be present in the bulk catalyst particles if all Group VIB and Group VIII non-noble metals were present in the form of their disulfides.

It will be clear to the skilled person that the catalyst the degree of sulfidation of which is to be measured is to be handled under an inert atmosphere prior to the determination of the degree of sulfidation.

The invention will be further illustrated by the following Examples:

EXAMPLE 1

17.65 g of ammonium heptamolybdate $(NH_4)_6Mo_7O_{24}*4H_2O$ (0.1 mole Mo, ex. Aldrich) and 24.60 g of ammonium metatungstate $(NH_4)_6H_2W_{12}O_{40}$ (0.1 mole W, ex. Strem Chemical) were dissolved in 800 ml water, giving a solution with a pH of about 5.2 at room temperature. The solution was subsequently heated to 90° C. (solution A). 35.3 g of nickel hydroxycarbonate $2NiCO_3*3Ni(OH)_2*4H_2O$ (0.3 mole Ni, ex. Aldrich) were suspended in 200 ml of water, and this suspension was heated to 90° C. (suspension B). The nickel hydroxycarbonate had a B.E.T. surface area of 239 $m^2/g$ (=376 $m^2/g$ NiO), a pore volume of 0.39 $cm^3/g$ (=0.62 $cm^3/g$ NiO) (measured by nitrogen adsorption), a median pore diameter of 6.2 nm, and a median particle diameter of 11.1 micrometer.

Then suspension B was added to solution A in 10 minutes, and the resulting suspension was maintained at 90° C. for a period of 18–20 hours with continuous stirring. At the end of this time, the suspension was filtered. The resulting solid was dried at 120° C. for 4 hours and subsequently calcined at 400° C. The yield was about 92%, based on the calculated weight of all metal components having been converted to their oxides.

The oxidic bulk catalyst particles had a B.E.T. surface area of 167 $m^2/g$ (=486 $m^2/g$ NiO=128% of the corresponding surface area of the nickel hydroxycarbonate), a pore volume of 0.13 $cm^3/g$ (=0.39 $cm^3/g$ NiO=63% of the pore volume of the nickel hydroxycarbonate), a median pore diameter of 3.4 nm (=55% of the median pore diameter of the nickel hydroxycarbonate), and a median particle diameter of 10.6 micrometer (=95% of the median particle diameter of the nickel hydroxycarbonate).

The X-ray diffraction pattern obtained after the calcination step is shown in FIG. 1. The characteristic full width at half maximum was determined to be 1.38° (on the basis of the peak at 2θ=53.82°).

Subsequently, the catalyst was sulfided: 1.5–2 g of the catalyst were placed in a quartz boat, which was inserted into a horizontal quartz tube and placed in a Lindberg furnace. The temperature was raised to 370° C. in about one hour with nitrogen flowing at 50 ml/min, and the flow continued for 1.5 h at 370° C. Nitrogen was switched off, and 10% $H_2S/H_2$ was then added to the reactor at 20 ml/min. The temperature was increased to 400° C. and held there for 2 hours. The heat was then shut off and the catalyst was cooled in flowing $H_2S/H_2$ to 70° C., at which point this flow was discontinued and the catalyst was cooled to room temperature under nitrogen.

The sulfided catalyst was evaluated in a 300 ml modified Carberry batch reactor designed for constant hydrogen flow. The catalyst was pilled and sized to 20/40 mesh and one gram was loaded into a stainless steel basket, sandwiched between layers of mullite beads. 100 ml of liquid feed, containing 5 wt % of dibenzothiophene (DBT) in decaline, were added to the autoclave. A hydrogen flow of 100 ml/min was passed through the reactor, and the pressure was maintained at 3150 kPa using a back-pressure regulator. The temperature was raised to 350° C. at 5–6° C./min, and the test was run until either 50% of the DBT had been converted or 7 hours had passed. A small aliquot of product was removed every 30 minutes and analyzed by gas chromatography (GC). Rate constants for the overall conversion were calculated as described by M. Daage and R. R. Chianelli (*J. Catal.*, 149, 414–427 (1994)).

The total DBT conversion (expressed as rate constant) at 350° C. ($\chi_{total}$) was measured to be 138*10$^{16}$ molecules/(g*s).

Comparative Example A

A catalyst was prepared as described in Example 1, except that only one Group VIB metal component was applied: a catalyst was prepared as in Example 1 using 35.3 g of ammonium heptamolybdate $(NH_4)_6Mo_7O_{24}*4H_2O$ (0.2 mole Mo) and 35.3 g of nickel hydroxycarbonate $2NiCO_3*3Ni(OH)_2*4H_2O$ (0.3 mole Ni). The yield was about 85%, based on the calculated weight of all metal components having been converted to their oxides. The catalyst was sulfided and tested as described in Example 1. The total DBT conversion (expressed as rate constant) at 350° C. ($\chi_{total}$) was measured to be 95.2*10$^{16}$ molecules/(g*s) and was thus significantly below that of Example 1.

Comparative Example B

A catalyst was prepared as described in Example 1, except that only one Group VIB metal component was used: a catalyst was prepared as in Example 1 using 49.2 g of ammonium metatungstate $(NH_4)_6H_2W_{12}O_{40}$ (0.2 mole W) and 35.3 g of nickel hydroxycarbonate $2NiCO_3*3Ni(OH)_2*4H_2O$ (0.3 mole Ni). The yield was about 90%, based on the calculated weight of all metal components having been converted to their oxides. The catalyst was sulfided and tested as described in Example 1. The total DBT conversion (expressed as rate constant) at 350° C. ($\chi_{total}$) was measured to be 107*10$^{16}$ molecules/(g*s) and was thus significantly below that of Example 1.

EXAMPLE 2

28.8 g of $MoO_3$ (0.2 mole Mo, ex. Aldrich) and 50.0 g of tungstic acid $H_2WO_4$ (0.2 mole W, ex. Aldrich) were slurried in 800 ml of water (suspension A) and heated to 90° C. 70.6 g of nickel hydroxycarbonate $2NiCO_3*3Ni(OH)_2*4H_2O$ (0.6 mole of Ni, ex. Aldrich) were suspended in 200 ml of water and heated to 90° C. (suspension B). Suspension B was added to suspension A in 60 minutes, and the resulting mixture was maintained at 90° C. for a period of 18 hours with continuous stirring. At the end of this time, the suspension was filtered and the resulting solid was dried at 120° C. for 4–8 hours and calcined at 400° C. The yield was about 99%, based on the calculated weight of all metal components having been converted to their oxides.

The oxidic bulk catalyst particles had a B.E.T. surface area of 139 $m^2/g$ (=374 $m^2/g$ NiO=99% of the corresponding surface area of the nickel hydroxycarbonate), a pore volume of 0.13 $cm^3/g$ (=0.35 $cm^3/g$ NiO=56% of the pore volume of the nickel hydroxycarbonate), a median pore diameter of 3.7 nm (=60% of the median pore diameter of the nickel hydroxycarbonate), and a median particle diameter of 14.5 micrometer (=131% of the median particle diameter of the nickel hydroxycarbonate)

The X-ray diffraction pattern of the oxidic bulk catalyst particles comprised peaks at 2θ=23.95 (very broad), 30.72 (very broad), 35.72, 38.76, 40.93, 53.80, 61.67, and 64.23°.

The characteristic full width at half maximum was determined to be 1.60° for the calcined catalyst composition (determined on the basis of the peak at 2θ=53.80°).

The catalyst was sulfided and the catalytic performance was tested as described in Example 1. The total conversion at 350° C. ($\chi_{total}$) was measured to be 144*10$^{16}$ molecules/(g*s).

The degree of sulfidation under conditions of use was 62%.

EXAMPLE 3

The preparation of Example 2 was repeated, except that instead of $H_2WO_4$ $(NH_4)_6H_2W_{12}O_{40}$ was used. The yield was about 96%, based on the calculated weight of all metal components having been converted to their oxides.

EXAMPLE 4

Example 2 was repeated with different amounts of nickel. The yields and the characteristic full width at half maximum (determined on the basis of the peaks in the range 2θ=53.66–53.92°) are given in the following Table:

| Molar amounts of metals added [mole] | | | | characteristic full width at half maximum in degrees 2θ for the |
|---|---|---|---|---|
| Ni | Mo | W | yield* | calcined samples |
| 1.0 | 0.5 | 0.5 | 96 | 1.47 |
| 1.25 | 0.5 | 0.5 | 100 | 1.50 |
| 1.5 | 0.5 | 0.5 | 99 | 1.60 |
| 2.0 | 0.5 | 0.5 | 99 | 1.32 |

*(based on the calculated weight of all metal components having been converted to their oxides)

EXAMPLE 5

Example 4 was repeated with different molybdenum: tungsten ratios.

The yields and the characteristic full widths at half maximum (determined on the basis of the peaks in the range 2θ=53.80–53.94°) are given in the following Table:

| Molar amounts of metals added [mole] | | | | characteristic full width at half maximum in degrees 2θ for the |
|---|---|---|---|---|
| Ni | Mo | W | yield* | calcined samples |
| 1.5 | 0.7 | 0.3 | 97 | 1.29 |
| 1.5 | 0.5 | 0.5 | 99 | 1.60 |
| 1.5 | 0.3 | 0.7 | 98 | 1.06 |
| 1.5 | 0.1 | 0.9 | 98 | 1.11 |

*(based on the calculated weight of all metal components having been converted to their oxides)

EXAMPLE 6

A catalyst composition was prepared in a manner analogous to the procedure described in Example 1. The resulting mixture was spray-dried. The spray-dried powder contained 43.5 wt % NiO, 20.1 wt % $MoO_3$, and 34.7 wt % $WO_3$. The pore volume of the spray-dried bulk catalyst particles was 0.14 ml/g, measured by nitrogen adsorption, and the B.E.T. surface area was 171 m$^2$/g.

The bulk catalyst particles were wet-mixed with 20 wt % of an alumina binder, based on the total weight of the catalyst composition. The water content of the mixture was adjusted in order to obtain an extrudable mix, and the mixture was subsequently extruded. After extrusion, the extrudate was dried at 120° C. and calcined at 385° C. The resulting catalyst composition had a B.E.T. surface area of 202 m$^2$/g, a pore volume measured by mercury porosimetry of 0.25 ml/g, and a side crush strength of 5.4 lbs/mm.

Part of the resulting catalyst was sulfided using a SRGO (straight run gas oil) spiked with DMDS (dimethyl disulphide) to obtain a total S content of 2.5 wt % S at 30 bar (LHSV=4 hr$^{-1}$, H:oil=200). The catalyst temperature was increased from room temperature to 320° C., using a ramp of 0.5° C./min, and kept at 320° C. for 10 hours. The samples were then cooled down to room temperature.

The degree of sulfidation of the sulfided catalyst composition under conditions of use was determined to be 52%

Another part of the catalyst was sulfided with a DMDS spiked feed. The thus sulfided catalyst was then tested with LCCO (light cracked cycle oil). The relative volume activity in hydrodenitrogenation was measured to be 281, compared to a commercially available alumina supported nickel and molybdenum-containing catalyst.

EXAMPLE 7

A catalyst composition was prepared in a manner analogous to the procedure described in Example 1. After the reaction was completed, peptized alumina (15 wt %, based on the total weight of the catalyst composition) was co-slurried with the bulk catalyst particles and the slurry was spray-dried. The resulting catalyst contained 13.2 wt % $Al_2O_3$, 33.9 wt % NiO, 20.5 wt % $MoO_3$ and 30.2 wt % $WO_3$. The pore volume of the oxidic catalyst composition was 0.17 ml/g, measured by nitrogen adsorption, and the B.E.T. surface area was 114 m$^2$/g. The spray-dried particles were mixed with an amount of water as required to form an extrudable mix. The resulting mixture was extruded and the resulting extrudates were dried at 120° C. and calcined at 385° C. The resulting catalyst composition had a B.E.T. surface area of 133 m$^2$/g, a pore volume measured by mercury porosimetry of 0.24 ml/g, and a side crush strength of 5.3 lbs/mm.

Part of the resulting catalyst was sulfided using a mixture of 10 vol % $H_2S$ in $H_2$ at atmospheric pressure (GHSV (gas hourly space velocity)=ca. 8700 Nm$^3$*m$^{-3}$*hr$^{-1}$). The catalyst temperature was increased from room temperature to 400° C., using a ramp of 6° C./min, and kept at 400° C. for 2 hours. The sample was then cooled down to room temperature in the $H_2S/H_2$ mixture.

The degree of sulfidation of the sulfided catalyst composition under conditions of use was determined to be 64%.

Another part of the catalyst was sulfided with a DMDS spiked feed. The thus sulfided catalyst was then tested with LCCO (light cracked cycle oil). The relative volume activity in hydrodenitrogenation was measured to be 235, compared to a commercially available alumina supported nickel and molybdenum-containing catalyst.

What is claimed is:

1. A process for the hydroprocessing of a hydrocarbon feedstock wherein said feedstock is contacted at hydroprocessing conditions with a catalyst composition which comprises bulk catalyst particles which comprise at least one Group VIII non-noble metal and at least two Group VIB metals, said Group VIII and Group VIB metals comprising from about 50 wt. % to about 100 wt. %, calculated as oxides, of the total weight of said bulk catalyst particles, said metals being present in the catalyst composition in their oxidic and/or sulfidic state, the catalyst composition having an X-ray diffraction pattern in which the characteristic full width at half maximum does not exceed 2.5° when the Group VIB metals are molybdenum, tungsten, and, optionally, chromium, or does not exceed 4.0° when the Group VIB metals are molybdenum and chromium or tungsten and chromium.

2. The process of claim 1 wherein a hydrocarbon feed is reacted with hydrogen at elevated temperature and elevated pressure, said hydroprocessing being selected from the group of processes consisting of hydrogenation, hydrodesulfurization, hydrodenitrogenation, hydrodemetallization, hydrodearomatization, hydroisomerization, hydrodewaxing, hydrocracking, and hydrocracking.

3. The process of claim 1 wherein said hydroprocessing conditions comprise temperatures in the range of from about 200° to 450° C., hydrogen pressures in the range of from about 5 to 300 bar, and space velocities (LHSV) in the range of from about 0.05 to 10 $h^{-1}$.

4. The process of claim 1 wherein said hydrocarbon feedstock is selected from the group consisting of middle distillates, kerosine, naphtha, vacuum gas oils, and heavy gas oils.

5. The process of claim 4 wherein the hydroprocessing conditions comprise temperatures in the range of from about 250° to 450° C., pressures in the range of from about 5 to 250 bar, space velocities in the range of from about 0.1 to 10 $h^{-1}$, and $H_2$/oil ratios in the range of from about 50 to 2000 Nl/l.

* * * * *